Patented May 1, 1934

1,956,921

UNITED STATES PATENT OFFICE 1,956,921

COLOR LAKES AND PROCESS OF PREPARING THE SAME

Carl Immerheiser and Bodo Zschimmer, Ludwigshafen-on-the-Rhine, Germany, assignors to General Aniline Works, Inc., a corporation of Delaware No Drawing. Application April 20, 1927, Serial No. 185,357. In Germany May 10, 1926

8 Claims. (Cl. 260—11)

The present invention relates to new color lakes and to a process of preparing the same.

It is known that color lakes possessing excellent properties as regards fastness can be obtained by treating a basic dyestuff, which may contain acid groups, with a complex acid, such as phosphotungstic acid, phosphotungstomolybdic acid, silicomolybdic acid, and the like, or a salt thereof. It is furthermore known that similar color lakes can be obtained by treating the said dyestuffs, not with the complex acids themselves, but with substances capable of producing such complex acids, the said substances being allowed to act simultaneously or in succession on the dyestuffs.

We have now found that color lakes possessing still better properties as regards fastness may be obtained by subjecting the color lakes prepared in the above described manner to a pressure treatment in the presence of a liquid at an elevated temperature, this treatment being applied either during the process of production, or as subsequent treatment of the finished lakes. In the latter case the treatment is carried out in the presence of an inorganic or organic liquid which may be of any kind, but should be capable of wetting or moistening the color lake and should not destroy it as would for example concentrated sulfuric acid. As examples of such liquids, water, alcohols, aliphatic or aromatic or other hydrocarbons, glycols and their ethers and the like may be mentioned. The liquid may be added either as such or in the form of saturated vapor.

The said treatment may be carried out in the presence of the substrata usually employed in the color lake industry, and dispersing agents such for example as glue, gum arabic, sulphite-cellulose waste liquor, Turkey-red oil, cholates, trihydroxyethyl-amine, and substances exerting a similar action, may also be present. In many cases we have found it advantageous to add to the color lakes, either during their preparation or during the subsequent treatment with pressure, suitable salts, and in particular such complex-formers, for example salts of molybdenum in the case of tungsten lakes, as are either absent from, or only present in insufficient amount in the lake.

The degree of pressure and temperature, and also the duration of the treatment, may be varied within wide limits. As a rule, the temperature should be above 50° C., preferably above 100° C. When effecting the treatment for example with steam, under a pressure of 2 to 4 atmospheres in an autoclave, a treatment for from 3 to 4 hours is in most cases sufficient, but in some cases the time may even be shorter.

The following examples will further illustrate how our invention may be carried into practical effect, but the invention is not limited to these examples. The parts are by weight.

Example 1

A color lake, prepared in the usual way by precipitating methyl violet B (see Schultz, Farbstofftabellen, 6th edition, No. 515) on aluminium hydroxide or blanc fixe with complex tungstic acid, is heated, in paste form, in an autoclave for 1 to 4 hours under a pressure of 3 atmospheres.

The color lake treated in this manner exhibits greater fastness to light and alkalis than the original color lake.

If, before heating in the autoclave, there be added to the untreated color lake a small quantity of a molybdenum salt, such as 1 to 2 per cent of its weight of ammonium molybdate, as a 10 per cent solution, the fastness to light is still further improved.

Example 2

A color lake is prepared by precipitating, on a substratum of heavy spar, aluminium hydroxid and blanc fixe (obtained by decomposing 10 parts of aluminium sulphate, (18 per cent of $Al_2O_3$), in a 10 per cent solution, with 5 parts of calcined soda, as a 10 per cent solution, and 12 parts of crystallized barium chlorid as a 10 per cent solution, in the presence of heavy spar) 1 part of the hydrochlorid of tetraethyl-diamidodiphenyl-monoethyl-alpha-amidonaphthyl-carbinol, as a 1 per cent solution, by means of 2 parts of ammonium molybdate, as a 10 per cent solution, 0.5 part of disodium phosphate, as a 10 per cent solution, and 2 parts by volume of hydrochloric acid, of 20° Bé. strength.

The resulting color lake, in paste form, is heated for about from 3 to 4 hours in an autoclave, under a pressure of 3 atmospheres. The color lake then exhibits greater fastness to light and alkalis than the lake which has not been subjected to a pressure treatment.

What we claim is:

1. The process which comprises heating in a closed vessel a color lake, formed from a basic dyestuff and a complex acid containing at least one of the acids selected from the group consisting of tungstic and molybdic acid, in the presence of a liquid which is capable of wetting said lake but not of destroying it, to a temperature sufficiently high as to give rise to super-atmospheric pressure, but not so high as to destroy said lake.

2. The process which comprises heating in a closed vessel a color lake, formed from a basic dyestuff and a complex acid containing at least one of the acids selected from the group consisting of tungstic and molybdic acid, in the presence of a liquid which is capable of wetting said lake, but not of destroying it, to a temperature above 100° C. to give rise to super-atmospheric pressure, but not so high as to destroy said lake.

3. The process which comprises heating in a closed vessel a color lake, formed from a basic dyestuff and a complex acid containing at least one of the acids selected from the group consisting of tungstic and molybdic acid and still containing a quantity of free dyestuff, in the presence of a solution of a compound selected from the group consisting of phosphoric acid, silicic acid and the alkali metal and ammonium salts of these acids to a temperature sufficiently high as to give rise to super-atmospheric pressure, but not so high as to destroy said lake.

4. The process which comprises heating in a closed vessel a color lake, formed from a basic dyestuff and a complex acid containing at least one of the acids selected from the group consisting of tungstic and molybdic acid, in the presence of water to a temperature above 100° C., but not so high as to destroy said lake.

5. The process which comprises heating in a closed vessel a color lake, formed from a basic dyestuff and a complex acid containing at least one of the acids selected from the group consisting of tungstic and molybdic acid, in the presence of water to a temperature giving rise to a pressure of from 2 to 4 atmospheres for from 3 to 4 hours.

6. Color lakes possessing a high degree of fastness to light and alkalies obtainable in accordance with claim 1.

7. Color lakes possessing a high degree of fastness to light and alkalies obtainable in accordance with claim 3.

8. Color lakes possessing a high degree of fastness to light and alkalies obtainable in accordance with claim 5.

CARL IMMERHEISER.
BODO ZSCHIMMER.